US008553875B2

(12) United States Patent
Basart et al.

(10) Patent No.: US 8,553,875 B2
(45) Date of Patent: *Oct. 8, 2013

(54) PHONE-INDEPENDENT KEY EXPANSION MODULE

(75) Inventors: Edwin J. Basart, Los Altos, CA (US);
Michael S. W. Tovino, Bend, OR (US);
Dale C. Tonogai, Los Altos, CA (US);
David B. Rucinski, Red Bank, NJ (US)

(73) Assignee: ShoreTel, Inc., Sunnyvale, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/107,645

(22) Filed: May 13, 2011

(65) Prior Publication Data

US 2011/0211496 A1    Sep. 1, 2011

Related U.S. Application Data

(63) Continuation of application No. 11/707,426, filed on Feb. 16, 2007, now Pat. No. 7,991,150, which is a continuation of application No. 11/479,602, filed on Jun. 30, 2006, now Pat. No. 7,940,906.

(60) Provisional application No. 60/701,237, filed on Jul. 20, 2005.

(51) Int. Cl.
*H04M 1/00* (2006.01)

(52) U.S. Cl.
USPC .................... 379/441; 379/422; 379/442

(58) Field of Classification Search
USPC ............ 379/88.18, 325, 419, 422, 441, 442
See application file for complete search history.

(56) References Cited

U.S. PATENT DOCUMENTS

| 5,029,198 | A | 7/1991 | Walpole et al. |
| 5,533,110 | A | 7/1996 | Pinard et al. |
| 5,631,954 | A | 5/1997 | Evan et al. |
| 5,764,731 | A | 6/1998 | Yablon |
| 6,295,341 | B1 | 9/2001 | Muller |
| 6,404,876 | B1 | 6/2002 | Smith et al. |
| 6,925,167 | B2 | 8/2005 | Suder et al. |

FOREIGN PATENT DOCUMENTS

| DE | 19543870 | 5/1996 |
| EP | 1763207 | 3/2007 |
| GB | 2328344 | 2/1999 |
| GB | 2343581 | 5/2000 |
| WO | WO 03028357 | 4/2003 |

OTHER PUBLICATIONS

Avaya Communication: "6400 Series Digital Telephones," Sep. 2001, 4 pages.

(Continued)

*Primary Examiner* — Creighton Smith
(74) *Attorney, Agent, or Firm* — Patent Law Works LLP

(57) ABSTRACT

A button box provides additional keys that can be used in conjunction with a telephone. In one embodiment, a button box is configured by associating it with a telephone and by programming its keys. When a key on the button box is activated, a key press event is sent from the button box to the associated phone. The phone treats the key press event as if a key on the phone itself had been activated and forwards the event to the voice switch appliance associated with the phone. (Alternatively, the key press event is sent from the button box directly to a voice switch appliance.) The button box's user interface is controlled by a voice switch appliance.

21 Claims, 5 Drawing Sheets

(56) References Cited

OTHER PUBLICATIONS

Avaya Inc., "User Guide: EU24/EU24BL Expansion Module Release 2," Apr. 2005, [online] [Retrieved on Jun. 27, 2006] Retrieved from the Internet <URL: http://support.avaya.com/elmodocs2/4620/250702_2.pdf>.I.

3Com Corporation, "Data Sheet: 3Com 3105 Attendant Console," Nov. 2005, [online] [Retrieved on Jun. 27, 2006] Retrieved from the Internet <URL: http://www.3com.com/other/pdfs/products/en_US/3com-400900.pdf>.

3Com Corporation, "Product Details: 3Com 3105 Attendant Console," date unknown, [online] [Retrieved on Jun. 27, 2006] Retrieved from the Internet <URL: http://www.3com.com/products/en_US/printsafe.jsp?sku=3C10405A&pathtype=purchase>.

Cisco Systems, Inc., "Data Sheet: Cisco IP Phone Expansion Module 7914," 2005, [online] [Retrieved on Jun. 27, 2006] Retrieved from the Internet <URL: http://www.cisco.com/application/pdf/en/us/guest/products/ps1856/c1650/ ccmigration_09186a008008883d.pdf>.

Cisco Systems, Inc., "Phone Guide: Cisco IP Phone Expansion Module 7914," 2005, [online] [Retrieved on Jun. 27, 2006] Retrieved from the Internet <URL: http://www.cisco.com/application/pdf/en/us/guest/products/ps1856/c1626/ccmigration_09186a00802def03.pdf>.

Extended European Search Report, EP06253795.6, Nov. 2, 2009, 13 pages.

Inter-Tel, Inc.: "CS-5200/5400 Communication Servers," Apr. 2005, 10 pages.

Nortel Networks, "IP Phone Key Expansion Module," 1999-2006, [online] [Retrieved on Jun. 27, 2006] Retrieved from the Internet <URL: http://www2.nortel.com/go/product_content.jsp?prod_id=49980>.

Partial European Search Report, EP06253795.6, Aug. 18, 2008, 6 pages.

Polycom: "Data Sheet: Polycom SoundPoint IP Expansion Module," Sep. 2005, [online] [Retrieved on Jun. 27, 2006] Retrieved from the Internet <URL: http://www.polycom.com/common/pw_cmp_updateDocKeywords/0,1687,4890,00.pdf>.

"User Guide Soundpoint IP 601 SIP 1.6x," Polycom, Inc., May 1, 2005, 35 pages, [online] [Retrieved on Oct. 11, 2006] Retrieved from the Internet URL:Http://www.polycom.com/common/pw_item_show_doc/0,1276,4887,00/pdf.

The Institute of Electrical and Electronics Engineers, Inc., "IEEE Standard 802.3-2005, Part 3: Carrier Sense Multiple Access with Collision Detection (CSMA/CD) Access Method and Physical Layer Specifications, Clause 33: Data Terminal Equipment (DTE) Power via Media Dependent Interface (MDI)," 2005, [online] [Retrieved on Jun. 27, 2006] Retrieved from the Internet <URL: http://standards.ieee.org/getieee802/download/802.3-2005_section2.pdf>, pp. 519-576.

Curtis F. Franklin: "3Com IntelliJack Networking Made for Electrical Contractors," Electrical Contracting Products, Jun./Jul. 2004, 2 pgs.

PHONE-INDEPENDENT KEY EXPANSION MODULE

CROSS-REFERENCE TO RELATED APPLICATIONS

The present application is a continuation of U.S. patent application Ser. No. 11/707,426, filed on Feb. 16, 2007, which is a continuation of U.S. patent application Ser. No. 11/479,602, filed on Jun. 30, 2006, entitled "Phone-Independent Key Expansion Module," now U.S. Pat. No. 7,940,906, which claims the benefit of U.S. Provisional Patent Application Ser. No. 60/701,237, filed on Jul. 20, 2005, entitled "IP-Based Device for Providing Additional Keys to an Existing Phone," both of which are incorporated herein by reference.

TECHNICAL FIELD

This invention relates generally to a device for adding keys to a phone and, more particularly, to a device that can add keys to any phone.

BACKGROUND

Telephones are often operated using keys, each of which provides a particular function. In some situations, it is helpful to have dozens of keys. For example, a receptionist who supports several people may want to have one key per person that can be used to transfer calls to that person and/or indicate whether that person's phone is in use. Rather than incorporate all of these keys into a phone, phone manufacturers have created a separate device, called a "key expansion module," that includes additional keys that can be used in conjunction with a phone.

In order to operate, a key expansion module (KEM) has various requirements. For example, a KEM needs to communicate with its associated phone in order to transmit key presses. A KEM also needs a source of power. And, if a KEM's keys are programmable, it needs a way to configure itself. One solution is to attach the KEM to its associated phone. Once the KEM and the phone are attached, they can communicate, and the phone can provide the necessary power and configuration.

Unfortunately, attaching the KEM to the phone means that the phone must be specially-designed. Since the phone needs extra hardware to support the KEM, the phone will be more expensive. If the phone is not used with a KEM, this extra hardware will be superfluous and will impose an unnecessary cost on the customer.

Also, the interface between the phone and the KEM (both physical and communicative) is often fixed. For example, the phone and the KEM might snap together to form a single device. Also, they might communicate using an external serial bus with a proprietary protocol. In these situations, a particular KEM is used with a particular phone. If the phone changes and/or the KEM changes, they may no longer be compatible.

What is needed is a key expansion module that can be used in conjunction with any phone.

SUMMARY OF THE INVENTION

Computer-integrated functionality is implemented using a server and/or a voice switch appliance in a distributed telephony environment. The server includes a telephony management software (TMS) unit, a telephony application programming interface (TAPI) unit, and an application unit, which are communicatively coupled. The voice switch appliance ("switch") includes a Voice over Internet Protocol (VoIP) device that serves as a gateway for various telephones and/or trunk lines. The server and the switch are coupled to each other via a network. Also coupled to the network are one or more endpoints (such as IP-based telephones and software telephones), one or more software applications that control these endpoints, and one or more button boxes.

A button box provides additional keys that can be used in conjunction with a telephone. In one embodiment, a button box is configured by associating it with a telephone and by programming its keys. When a key on the button box is activated, a key press event is sent from the button box to the associated phone. The phone treats the key press event as if a key on the phone itself had been activated and forwards the event to the voice switch appliance associated with the phone. (Alternatively, the key press event is sent from the button box directly to a voice switch appliance.) The button box's user interface is controlled by a voice switch appliance.

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1:
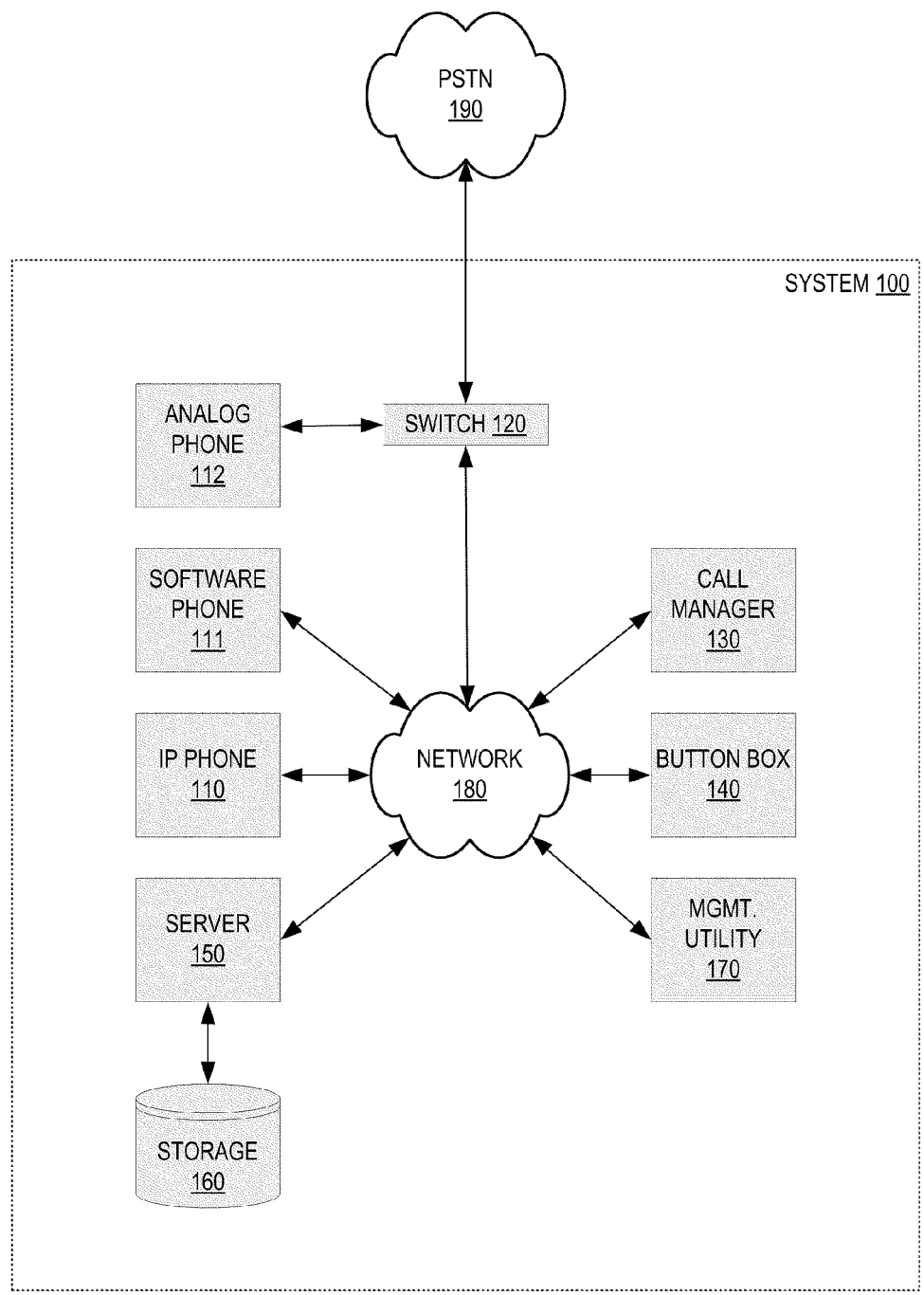
FIG. 1 illustrates a block diagram of a distributed telephony system architecture, according to one embodiment of the present invention.

The present invention is now described more fully with reference to the accompanying figures, in which several embodiments of the invention are shown. The present invention can be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer-readable media can implement the features, functionalities, or modes of usage described herein. For instance, an apparatus embodiment can perform the corresponding steps or acts of a method embodiment.

A. Overview of Phone-Independent Key Expansion Module (KEM)

Telephones are often operated using keys. A key has various characteristics, such as its appearance, its function, and whether it is programmable. Regarding appearance, a key can be tangible (e.g., a physical button that can be pressed) or virtual (e.g., a software key ("soft key") that comprises a selectable area of a touch screen display). Regarding function, a numeric/symbol key is used to enter a piece of information, such as a digit (0-9) or a symbol (* or #), while a feature key is used to perform a function (e.g., a call control function such as transfer, hold, or conference). If a key is programmable (i.e., its function can be changed), the key is said to be "custom." If it is not programmable, the key is said to be "dedicated."

If a user wants additional keys beyond those available on her phone, she can use a key expansion module (KEM), which provides additional keys. Although these keys are located on a separate device (the KEM), they behave as if they were located on the user's phone. For example, activating a key of a particular type will have the same effect regardless of whether the key is located on the user's phone or on a KEM.

A new KEM, which will be referred to as a "button box," can be used in conjunction with any Internet Protocol (IP)-based telephone. In one embodiment, a button box's keys are programmable. In this embodiment, a button box is configured by 1) associating it with a phone and 2) programming its keys. In one embodiment, a button box does not include an audio input device (e.g., a microphone). In another embodiment, a button box does not include an audio output device (e.g., a speaker).

In general, a button box's functionality is implemented as follows: When a key on the button box is activated, a "key press" event is sent from the button box to the associated phone. The phone treats the key press event as if a key on the phone itself had been activated and forwards the event to the voice switch appliance associated with the phone. (Alternatively, the key press event is sent from the button box directly to a voice switch appliance.) The button box's user interface is controlled by a voice switch appliance.

B. System Architecture

Enterprise telephony systems, which comprise a distributed set of switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers, and application services.

FIG. 1 illustrates a block diagram of a distributed telephony system architecture, according to one embodiment of the present invention. The illustrated embodiment of the system 100 includes three endpoints (an IP phone 110, a software phone 111, and an analog phone 112), a voice switch appliance ("switch") 120, a device running a call manager software application 130, a button box 140, a server 150, a storage device 160, a device running a management utility software application 170, and a network 180. FIG. 1 also includes a public switched telephone network (PSTN) 190, which is communicatively coupled to the system 100 via the switch 120.

The IP phone 110, the software phone 111, the switch 120, the device running the call manager software application 130, the button box 140, the server 150, and the device running the management utility software application 170 are communicatively coupled to each other via the network 180. The analog phone 112 is communicatively coupled to the switch 120. The storage device 160 is communicatively coupled to the server 150.

An endpoint enables a user to carry on a phone call and includes a user interface to convey data to and receive data from the user. An analog phone 112 includes, for example, a Telephone User Interface (TUI) that conveys data through a speaker and receives data through a microphone and a keypad. An IP phone 110 includes, for example, both a TUI and a graphical user interface that conveys data through a display device associated with the IP phone 110. In one embodiment, an IP phone's graphical user interface also receives data from a touchscreen display device associated with the IP phone 110. A software phone 111 includes, for example, a software application that runs on a computer and conveys data through a display device and a speaker and receives data through a microphone, a keyboard, and a pointing device.

In one embodiment, an IP phone 110 is a ShorePhone IP phone (such as an IP560, IP 560g, or IP 530 phone) from ShoreTel, Inc. of Sunnyvale, Calif. In another embodiment, a software phone 111 is a ShorePhone software phone (such as a SoftPhone phone) from ShoreTel, Inc. of Sunnyvale, Calif. In yet another embodiment, an analog phone 112 is a ShorePhone analog phone (such as an AP100 phone) from ShoreTel, Inc. of Sunnyvale, Calif.

A voice switch appliance ("switch") 120 comprises a Voice over Internet Protocol (VoIP) device that serves as a gateway for various telephones (IP-based or analog) and/or trunk lines (digital or analog). In FIG. 1, the switch 120 is communicatively coupled to an analog phone 112. It is also communicatively coupled to the network 180 and therefore can communicate with a variety of network-enabled devices. The switch 120 is also communicatively coupled to the PSTN 190 via an analog or digital trunk line (e.g., a T1 or E1 interface). In the illustrated configuration, the switch 120 provides an interface for calls originating from or terminating on the PSTN 190. A switch 120 also provides call control functionality. For example, a switch 120 can execute a call control function such as barge in, conference, forward, hold, transfer, etc.

In one embodiment, a switch 120 controls a user interface (e.g., a display device and/or an LED) of an IP-enabled device such as an IP phone 110 or a button box 140. In this embodiment, an IP-enabled device is associated with a switch 120. An association between an IP-enabled device and a switch 120 is accessed through a server 150. The switch 120 sends a signal to the associated IP-enabled device that causes the device's user interface to present information. For example, a signal from a switch 120 can cause an IP phone's display device to show the user's name, the user's extension number, and the current date and time. In another embodiment, this information can be localized (e.g., using Unicode characters and a Unicode-enabled phone). In one embodiment, a switch 120 is a ShoreGear voice switch (such as a 120/124, T1, or E1 switch) from ShoreTel, Inc. of Sunnyvale, Calif.

A device running a call manager software application 130, such as a general-purpose computer, controls one or more endpoints with which it is associated. A call manager 130 provides a user with an interface through which she can perform call-related functions. In one embodiment, multiple call managers 130 control the same endpoint. An association between a call manager 130 and an endpoint that it controls is accessed through a server 150. In one embodiment, a call manager 130 is a ShoreWare desktop software application (such as a Personal Call Manager, Advanced Call Manager, or Operator Call Manager application) from ShoreTel, Inc. of Sunnyvale, Calif.

A button box 140 provides additional keys that can be used in conjunction with an IP phone 110. In one embodiment, a button box 140 is a ShorePhone button box (such as a BB24 button box) from ShoreTel, Inc. of Sunnyvale, Calif. Button boxes 140 will be further discussed below.

A server 150 is configured to implement features or functions of the present invention. In one embodiment, a server executes one or more software applications in order to provide various voice-related services such as voice mail, an automated attendant, and a contact center. A server 150 is communicatively coupled to a network 180 and a storage device 160 and will be further discussed below. In one embodiment, a server 150 executes various ShoreWare software applications (such as a ShoreWare Voice Mail application) from ShoreTel, Inc. of Sunnyvale, Calif.

A storage device 160 contains information that is used to support a button box 140. Alternatively, this information can be stored in a server 150. In one embodiment, button box information includes a layout that describes the programming of one or more button box keys. In another embodiment, this information includes one or more associations, such as between a button box 140 and an IP phone 110 or between a button box 140 and a switch 120.

In yet another embodiment, one IP phone 110 is associated with a group of button boxes 140, and each button box 140 in the group includes a unique identifier, which is also part of the button box information. In one embodiment, the first button box 140 that is associated with an IP phone 110 receives the identifier "1," the second receives the identifier "2," and so on. In the illustrated embodiment, the storage device 160 is directly coupled to the server 150. In an alternate embodiment, the storage device 160 is coupled to the server 150 via the network 180.

A device running a management utility software application 170, such as a general-purpose computer, enables a user to manage various aspects of a system 100. In one embodiment, a management utility 170 provides a user with an interface through which she can perform various tasks such as installation, administration, maintenance, and call detail reporting. In one embodiment, a management utility 170 is a ShoreWare browser-based software application (such as a Director application) from ShoreTel, Inc. of Sunnyvale, Calif.

In one embodiment, a network 180 includes a partially-public or wholly-public network such as the Internet. In other embodiments, a network 180 includes a private network or one or more distinct or logical private networks (e.g., virtual private networks or wide area networks). Communication links to and from the network 180 can be wireline or wireless (e.g., terrestrial- or satellite-based transceivers). In one embodiment, a network 180 is a packet-switched network such as an IP-based wide or metropolitan area network that uses the Ethernet protocol.

The system 100 in FIG. 1 is used only by way of example. It is not necessary for a telephony system 100 to include all of the elements shown in FIG. 1. In one embodiment, a system 100 includes multiple elements of the same type or different elements that are not shown in FIG. 1. For example, in one embodiment, a system 100 includes two switches 120 and an edge router (not shown) to provide local area connectivity for the switches. Also, numerous configurations of switches 120 and communication links are possible. For example, PSTN 190 links can be coupled to multiple switches 120 at several points within the topology, and software switches can also be used.

C. Server Architecture

Figure 2:
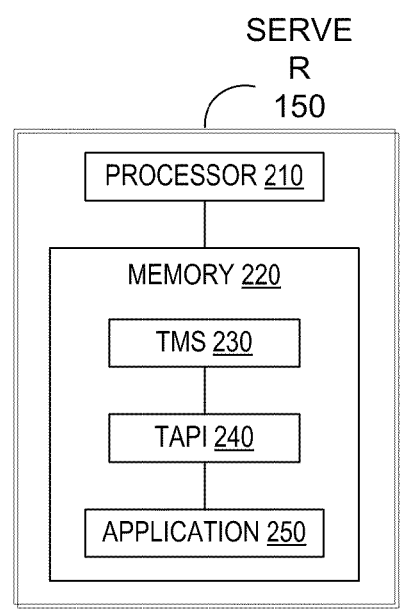
FIG. 2 illustrates a block diagram of a server architecture, according to one embodiment of the present invention.

FIG. 2 illustrates a block diagram of a server architecture, according to one embodiment of the present invention. In this embodiment, a server 150 is configured to implement features or functions of the present invention. A server 150 includes a processor 210. In one embodiment, a processor 210 is a conventional processing device, such as a general-purpose microprocessor.

A server 150 also includes a memory 220. A memory 220 includes program instructions or functional units that implement features of the present invention. Specifically, a memory 220 includes a telephony management software (TMS) unit 230 and a telephony application programming interface (TAPI) unit 240.

In one embodiment, a memory 220 also includes one or more application units 250 that interact with the TMS unit 230 and the TAPI unit 240 to enable a specific computer-integrated function. An application unit 250 uses the TAPI unit 240 to exchange data with the TMS unit 230. The TMS unit 230 is able to communicate with and manage one or more switches 120. For example, with reference to FIG. 1, the TMS unit 230 included in the server 150 can manage the switch 120. Through the TAPI unit 240, the TMS unit 230 presents an application unit 250 with a computer-telephony integration (CTI) view of a switch 120. This enables the application unit 250 to manage the switch 120. A switch 120 can operate without an associated TMS unit 230 if CTI features are not being used.

D. Button Box

Figure 3:
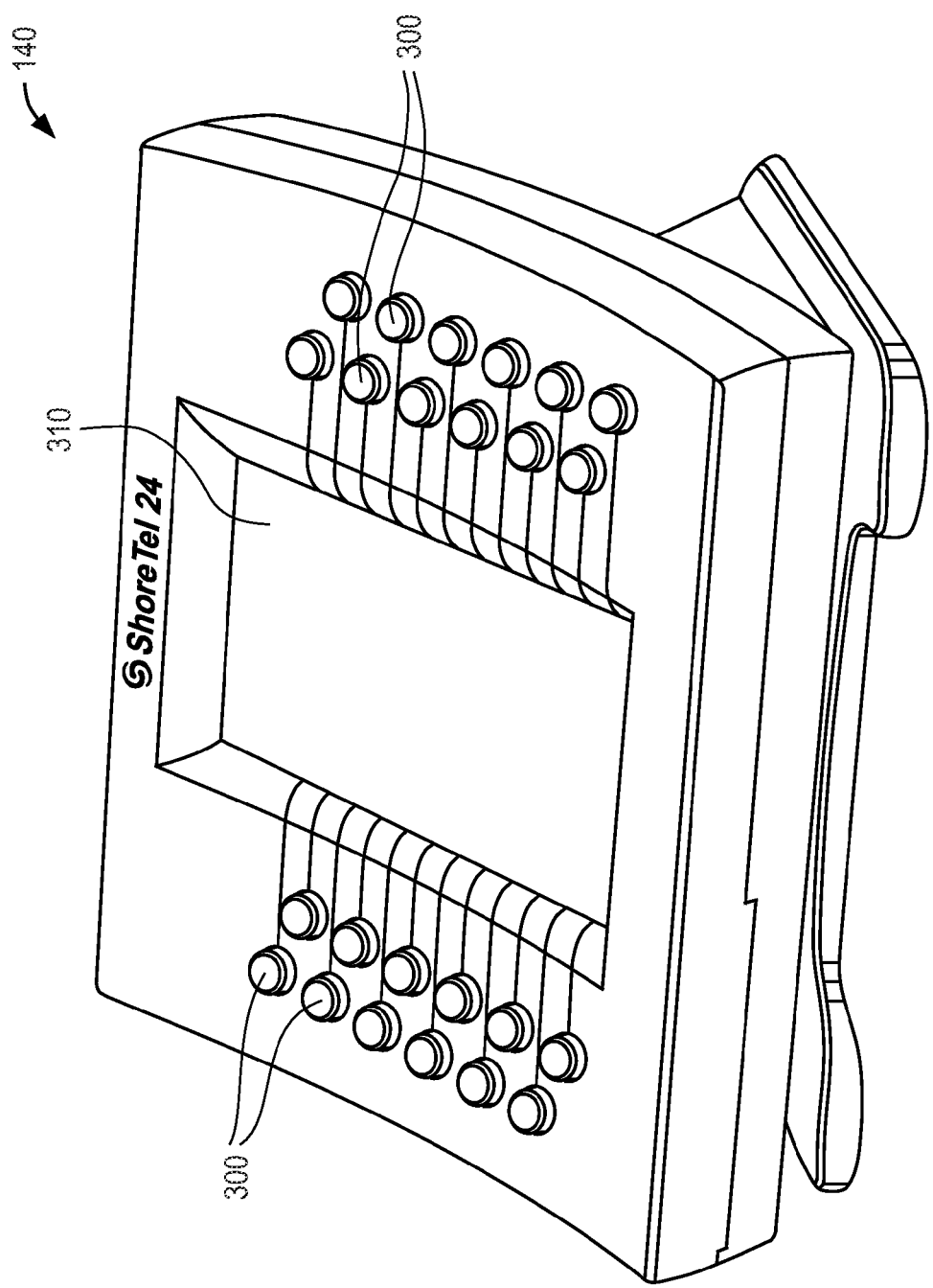
FIG. 3 is a perspective view of a button box showing various features, according to one embodiment of the invention.

FIG. 3 is a perspective view of a button box showing various features, according to one embodiment of the invention. In the illustrated embodiment, the button box 140 includes twenty-four keys 300 and one display device 310. The illustrated keys 300 are translucent physical buttons that can be pressed. A key 300 contains an LED that is used to indicate status information. In one embodiment, the LED is tri-color and can be green, amber, or red (steady or blinking). Activating a key 300 executes a particular function. A key 300 is programmable, so the particular function can be changed. In other embodiments, button boxes 140 include different numbers and/or types of keys.

In the illustrated embodiment, the display device 310 is an LCD screen. It measures 80 pixels by 168 pixels and 13 characters by 14 lines. The illustrated display 310 is grayscale and backlit. In FIG. 3, the display 310 is blank. In other embodiments, button boxes 140 include different numbers, sizes, and/or types of displays 310.

In one embodiment, when a button box 140 is not associated with a phone, the top line shows the IP address of the button box 140, and the next line shows "Unbound." When a button box 140 is associated with a phone, but the phone is not associated with a user, the top line shows "Anonymous" or "Available," and the next line shows "Button Box" followed by the identifier of the button box 140. When a button box 140 is associated with a phone, and the phone is associated with a user, the top line shows the extension number of the user, and the next line shows "Button Box" followed by the identifier of the button box 140.

Figure 4:
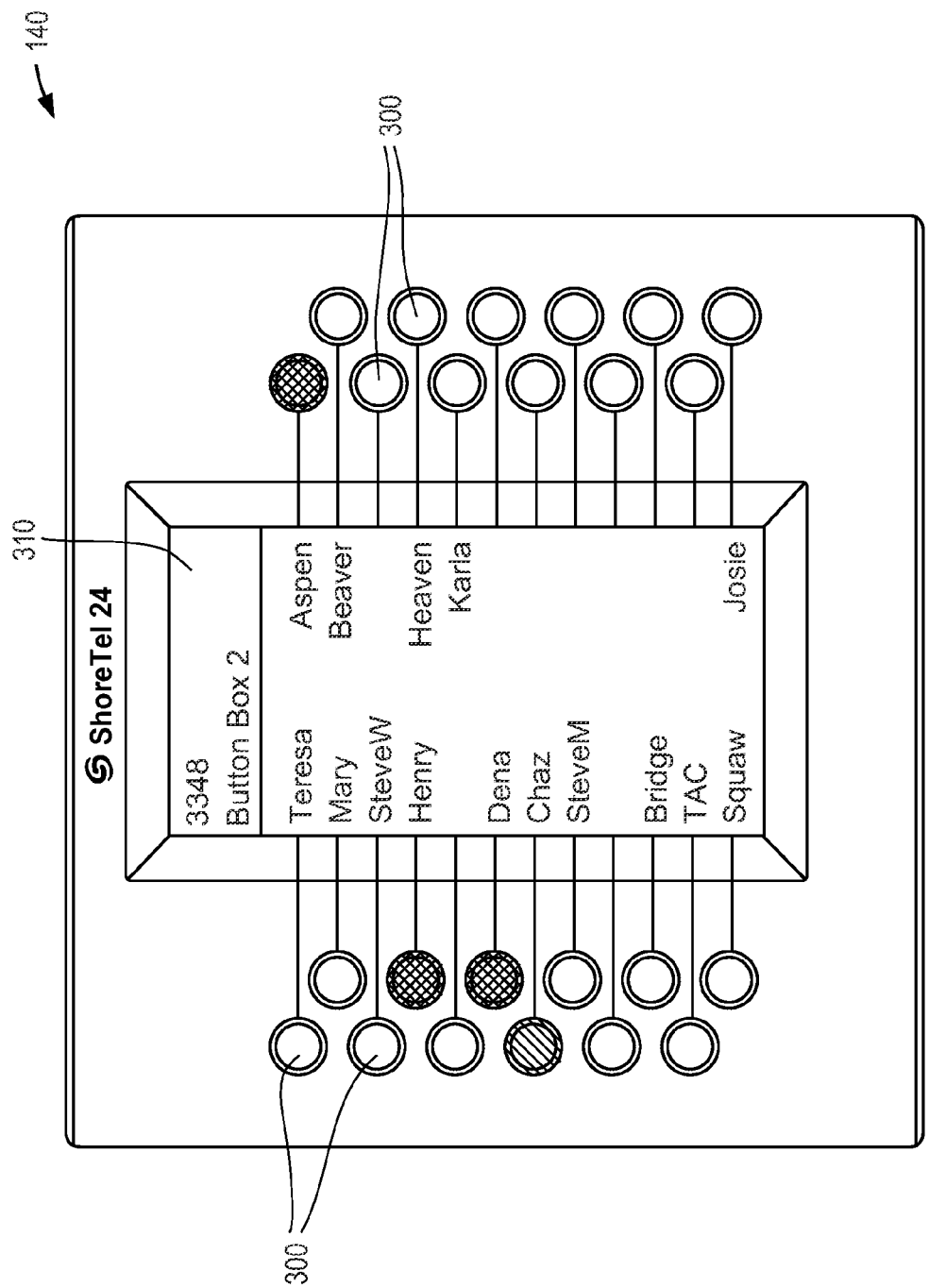
FIG. 4 is a plan view of a button box showing various features, according to one embodiment of the invention.

FIG. 4 is a plan view of a button box showing various features, according to one embodiment of the invention. In FIG. 4, the display 310 shows various pieces of information, and four keys 300 are lighted (three red and one amber). The top line of the illustrated display 310 shows the user's extension (here, "3348"), and the next line shows "Button Box" followed by the identifier of the button box 140 (here, "2").

The remaining 12 lines are divided into two columns of 6 characters each. In one embodiment, these 24 cells (two per line, 12 lines total) are used as labels for the keys 300 (e.g., to indicate the functions assigned to the various keys). In the illustrated embodiment, each line includes two labels: one for the key 300 located to the left of the display 310, and one for the key 300 located to the right of the display 310. In one embodiment, a display 310 supports multiple languages, such as English, French, German, and Spanish. In another embodiment, a display 310 shows different pieces of information and/or shows information in different ways.

In one embodiment, a button box 140 is an Internet Protocol (IP)-based device. It communicates with other IP-enabled devices (see below) over a network 180 using Ethernet. In one embodiment, a button box 140 includes a two-port Ethernet switch that is compatible with the 802.3af Power-over-Ethernet (PoE) standard. An Ethernet uplink is used to connect the button box 140 to the network 180 via a wall jack. The uplink can also be used to obtain power for the button box 140 via PoE. Alternatively, the button box 140 can obtain power from an electrical outlet using a power adaptor. An Ethernet downlink can be used to daisy chain a downstream device onto the button box 140 (e.g., an IP phone 110 or a second button box 140). The button box 140 forwards power to the downstream device using PoE. Alternatively, the downstream device can obtain power using a power adaptor.

When a button box 140 first attaches to a network 180, it becomes associated with a switch 120. This switch 120 controls the button box's user interface (e.g., the display 310 and the LED-enabled keys 300) by sending various signals to the button box 140. In one embodiment, the switch 120 updates the button box's user interface based on calling activity taking place on the associated phone or on other phones (e.g., monitored extensions). In one embodiment, a button box 140 remains associated with the same switch 120 even if the button box's configuration is changed. In one embodiment, an association between a button box 140 and a switch 120 is stored by a storage device 160 and accessed via a server 150.

The button box 140 is configured by associating it with an IP phone 110 and by programming one or more of its keys 300. One way to associate a button box 140 with a phone is by using the management utility 170. For example, the management utility 170 enables a user to select a button box 140, select a phone, and create an association between them. Another way to associate a button box 140 with a phone is by using an interface on the button box 140 or an interface on the phone. For example, the application unit 250 in the server 150 communicates with the button box 140 or the phone and creates an association as requested by a user via the device's interface. In another embodiment, an association is created automatically when a button box 140 is connected to a phone (e.g., via the button box's Ethernet downlink and the phone's Ethernet uplink). In one embodiment, an association between a button box 140 and a phone is stored by a storage device 160 and accessed via a server 150.

In one embodiment, after a button box 140 has been associated with a phone, the switch 120 associated with the button box 140 sends the button box 140 a message that contains the IP address of the associated phone. In one embodiment, this message adheres to the Media Gateway Control Protocol (MGCP) standard (RFC 3435). The switch 120 can access the phone's IP address through the server 150.

In one embodiment, a phone can be associated with a group of button boxes 140. Each button box 140 in the group is assigned a unique identifier so that the phone can distinguish the various button boxes 140. In this embodiment, the switch 120 associated with the button box 140 also sends the button box 140 its unique identifier.

In another embodiment, the switch 120 also informs the phone of its associated button boxes 140 (e.g., by sending the phone their IP addresses). This enables the phone to identify legitimate button boxes 140.

An association between a button box 140 and a phone can also be removed. One way to do this by using the management utility 170. For example, the management utility 170 enables a user to select an association and delete it. Another way to do this is by using an interface on the button box 140 or an interface on the phone. For example, the application unit 250 in the server 150 communicates with the button box 140 or the phone and deletes an association as requested by a user via the device's interface. In another embodiment, an association is deleted automatically when a button box 140 is disconnected from a phone. Yet another way to do this is by associating a button box 140 with a (non-existent) phone whose IP address is 0.0.0.0.

The programming of a key 300 on a button box 140 is described by a "layout." A layout is a set of information that indicates, for one or more keys 300, which function is assigned to each key 300. In one embodiment, a layout also includes a parameter for a function. In another embodiment, a layout also includes a label for a key 300, which will be shown by the button box's display 310.

In one embodiment, a layout is associated with a user. For example, assume that a button box 140 has been associated with a particular phone. If a user becomes associated with that phone (e.g., by "logging in" to the phone), the keys 300 on the associated button box 140 will be programmed according to her layout. In one embodiment, a user can be associated with multiple layouts. This is useful, for example, if the person wants to use multiple button boxes 140 simultaneously (so that she has more keys available to use).

In one embodiment, a layout is a software file that is stored by the storage device 160 and accessed using the server 150. A switch 120 associated with a button box 140 accesses the button box's layout so that it can determine which labels the button box 140 should display (and instruct the button box 140 to do so). A switch 120 associated with a button box's phone accesses the button box's layout so that it can determine which function corresponds to a key press event that it received from the button box 140 (directly or via the associated phone). In one embodiment, a copy of a layout is stored at a switch 120 so that the switch can access the layout without needing to use the server 150.

One way to modify a button box's layout is by using the management utility 170. Another way is by using an interface on the phone that is associated with the button box 140. For example, the phone prompts the user to select a button box key 300 ("Press the key on the button box that you want to program"), and then select a function for that key. In one embodiment, the user is also prompted to enter a parameter (such as an extension number or phone number) to be used with the function. The information supplied by the user is then used to modify the button box's layout. In one embodiment, after a layout has been modified, a switch 120 is notified of this fact and/or sent the new layout. If the switch 120 is associated with the button box 140, it can then update the button box's user interface accordingly (e.g., a label associated with a key 300).

In one embodiment, a portion of the button box's display 310 is used to show a label for a key 300. This label can be automatically generated (e.g., based on the key's function), or it can be specified by the user. Similar to assigning a function to a key 300, a user can specify a label via either the management utility 170 or an interface on the associated phone.

Assume that a button box 140 has been attached to a network 180 and has been configured. When a key 300 on the button box 140 is activated, the button box 140 generates a "key press" event that it sends to its associated phone (using the IP address that was earlier received from a switch 120). Alternatively, the button box 140 sends the key press event directly to a switch 120. Sending the key press event to the associated phone helps avoid race conditions. If the button box 140 is not associated with a phone, it sends the key press event to its switch 120.

A key press event includes information that identifies which key was pressed. In one embodiment, the key press event also includes the identifier of the button box 140 that generated the key press event. The button box 140 identifier is used to determine the layout that is associated with the button box 140. This is useful if there are multiple button boxes 140 associated with the phone (each of which has its own layout) or if the phone itself includes programmable keys (and thus has its own layout). In one embodiment, the key press event is sent using the MGCP standard's event notification mechanism.

The phone receives the key press event and forwards it to its switch 120 (which can be different from the button box's switch). In one embodiment, before the phone forwards the key press event, it determines whether the event was received from a legitimate button box 140 (based on the information that was earlier received from a switch 120). If it was, then the phone forwards the event to its switch 120. Otherwise, the phone does not forward the event.

Note that the phone sends two types of key press events to its switch 120: events that originated from the phone itself, and events that originated from the button box 140 associated with the phone. The phone's switch 120 can distinguish between these events (e.g., based on the existence of a button box 140 identifier). In one embodiment, however, the phone switch 120 treats the button box key press events in the same way that it treats the phone key press events. Namely, it determines the desired function based on the appropriate layout and which key was activated. This means that the additional keys 300 on the button box 140 really are treated the same way as the keys on the phone itself.

E. Example

Figure 5:
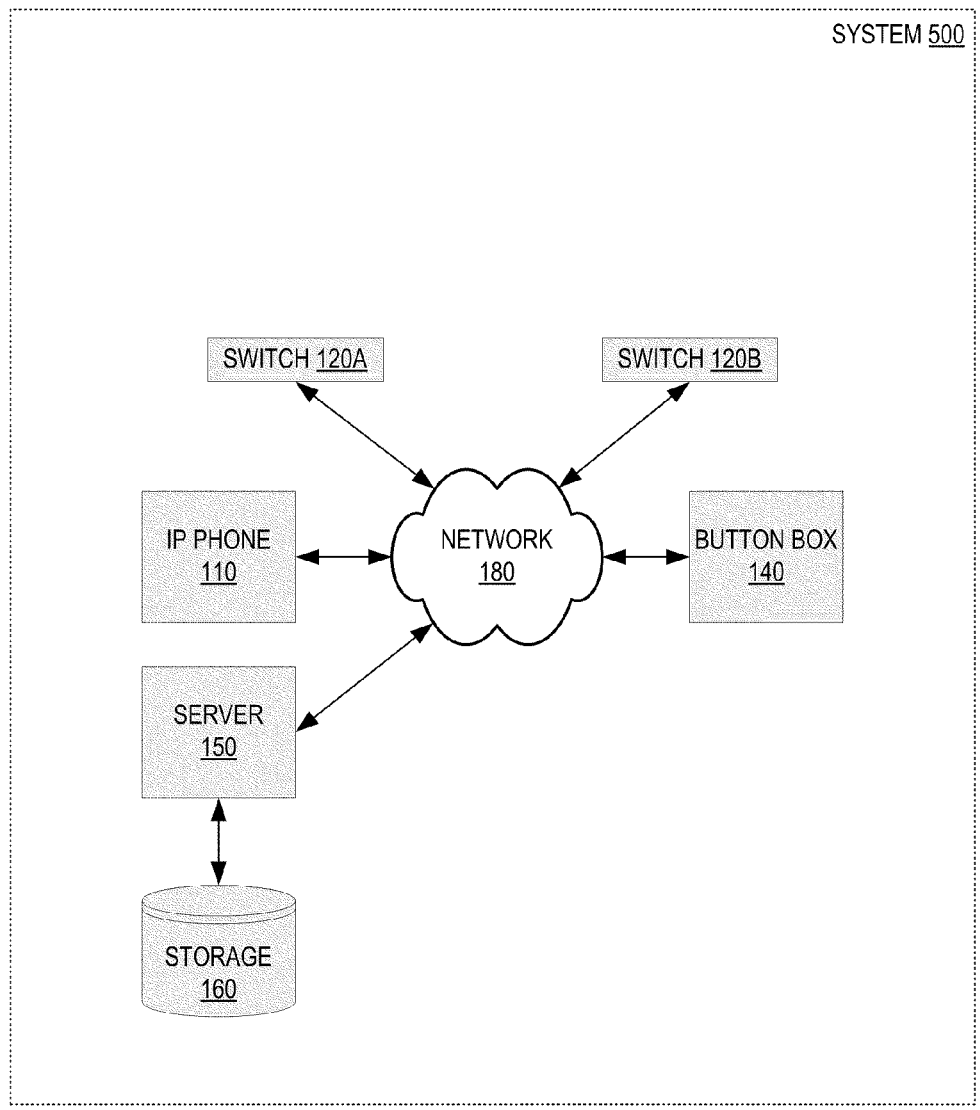
FIG. 5 illustrates a block diagram of a distributed telephony system architecture, according to one embodiment of the present invention.

FIG. 5 illustrates a block diagram of a distributed telephony system architecture, according to one embodiment of the present invention. The illustrated embodiment of the system 500 includes an IP phone 110, two switches 120A/120B, a button box 140, a server 150, a storage device 160, and a network 180.

Assume that the IP phone 110 is associated with the switch 120A, and the button box 140 is associated with the switch 120B. This means that the switch 120A controls the IP phone's user interface, while the switch 120B controls the button box's interface. In other words, the IP phone 110 and the button box 140 do not have to be associated with the same switch 120.

The IP phone 110 and the button box 140 become associated (using any of the methods described above). This association is stored by the storage device 160. The button box's switch 120B instructs the button box 140 to update its display 310 accordingly. The button box's switch 120B also sends a message to the button box 140 that contains the IP address of the associated IP phone 110. If the phone 110 were also programmable or if there were already another button box associated with the same IP phone 110 (not shown), then the switch 120B would also notify the button box 140 of its unique identifier (e.g., "2"). In the illustrated embodiment, however, this is not the case, so a button box identifier is not used. The switch 120A could also notify the IP phone 110 of the button box 140 (e.g., its IP address) for later use in determining the legitimacy of received key press events.

A button box key 300 becomes programmed to monitor a particular phone extension (using any of the methods described above). For example, the key's label (part of the display 310) indicates the extension number that is being monitored. The key's LED indicates the status of the monitored extension.

In one embodiment, a monitored extension's status is shown by an LED as follows:

Clear (i.e., LED turned off): Target extension is idle.

Steady Amber: Target extension is do-not-disturb (DND).

Steady Red: Target extension has an active call to someone other than the monitoring user.

Blinking Green: Target extension has held calls, but no offering or active calls.

Slow Blinking Green: Target extension has one or more offering calls but no active calls.

Blinking Red: Target extension has one or more offering calls and an active call.

In one embodiment, a label can also indicate a monitored extension's status. For example, if a label is shown in reverse video (e.g., white characters on a black background rather than black characters on a white background), then the target extension has a message waiting.

In order to monitor an extension, the button box's switch 120B receives information from the server 150 about the status of the extension. The switch 120B then instructs the button box 140 to update its user interface (e.g., its display 310 and/or LED keys 300) accordingly. The IP phone's switch 120A also monitors the extension and receives information from the server 150. This enables the phone's switch 120A to behave properly when it receives a key press event that originated from the button box 140.

For more information about Extension Monitoring functionality and implementation, see U.S. patent application Ser. No. 10/932,614, filed on Sep. 1, 2004, and entitled "Extension Monitoring in a Distributed Telephony System," which is hereby incorporated by reference.

Having described embodiments of a button box and a distributed telephony system that supports it (which are intended to be illustrative and not limiting), it is noted that modifications and variations can be made by persons skilled in the art in light of the above teachings. It is therefore to be understood that changes can be made in the particular embodiments of the invention disclosed that are within the scope and spirit of the invention as defined by the appended claims and equivalents.

What is claimed is:

1. A system configured to enable a user to invoke a call control function using a button box device, comprising:
a switch configured to receive a key press event via a packet-switched network and to determine a call control function associated with the key press event; and
a button box device configured to send the key press event via the packet-switched network.

2. The system of claim 1, further comprising a telephone, wherein the telephone is configured to receive the key press event via the packet-switched network and to send the key press event to the switch, and wherein the button box device is configured to send the key press event to the telephone.

3. The system of claim 1, wherein the key press event comprises a key identifier.

4. The system of claim 3, further comprising a storage device containing an association between the key identifier and the call control function.

5. The system of claim 3, further comprising a storage device containing multiple associations between the key identifier and a call control function, wherein the key press event further comprises a button box identifier, and wherein the button box identifier indicates one association of the multiple associations.

6. The system of claim 3, further comprising a storage device containing multiple associations between the key identifier and a call control function, wherein the button box device is associated with a telephone, and wherein the telephone is associated with the user, and wherein an identity of the user indicates one association of the multiple associations.

7. A method to enable a user to invoke a call control function using a button box device, the method comprising:
receiving, at a switch, a key press event via a packet-switched network from the button box device, wherein the button box device sends the key press event via the packet-switched network; and
determining, at the switch, a call control function associated with the key press event.

8. The method of claim 7, further comprising:
receiving, at a telephone, the key press event via the packet-switched network and sending the key press event to the switch, wherein the button box device is configured to send the key press event to the telephone.

9. The method of claim 7, wherein the key press event comprises a key identifier.

10. The method of claim 9, further comprising:
associating the key identifier and the call control function.

11. The system of claim 10, further comprising:
storing, at a storage device, an association between the key identifier and the call control function.

12. The method of claim 9, further comprising:
storing, at a storage device, multiple associations between the key identifier and a call control function, wherein the key press event further comprises a button box identifier, and wherein the button box identifier indicates one association of the multiple associations.

13. The method of claim 9, further comprising:
storing, at a storage device, multiple associations between the key identifier and a call control function, wherein the button box device is associated with a telephone, and wherein the telephone is associated with the user, and wherein an identity of the user indicates one association of the multiple associations.

14. A method for enabling a user to invoke a call control function using a button box device, comprising:
receiving a key press event, wherein the key press event comprises a key identifier from the button box device, wherein the button box device is associated with a telephone and the telephone is associated with the user;
determining a call control function associated with the key press event, wherein (1) determining the call control function associated with the key press event comprises identifying an association between the key identifier and the call control function and (2) identifying the association between the key identifier and the call control function comprises identifying the association between the key identifier and the call control function based on an identity of the user; and
executing the call control function.

15. The method of claim 13 wherein receiving the key press event from the button box device comprises receiving the key press event from the button box device at a switch.

16. The method of claim 14, wherein the button box device displays a label for a key associated with the key press event.

17. The method of claim 16, wherein the label is specified by the user.

18. The method of claim 16, wherein the label is generated automatically.

19. The method of claim 14, wherein the association between the key identifier and the call control function is provided by a management utility.

20. The method of claim 14, further comprising:
receiving a parameter associated with the call control function.

21. The method of claim 20, wherein the user is prompted to enter the parameter.

* * * * *